United States Patent
Kano et al.

(10) Patent No.: US 8,984,443 B2
(45) Date of Patent: Mar. 17, 2015

(54) DYNAMIC SOFT KEY ARRANGEMENT BASED ON PHONE ORIENTATION AND USER PREFERENCES

(75) Inventors: Izua Kano, Tokyo (JP); Kazuhiro Yamada, Tokyo (JP); Dai Kamiya, Tokyo (JP); Yasushi Onda, Tokyo (JP); Keiichi Murakami, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 144 days.

(21) Appl. No.: 12/811,729

(22) PCT Filed: Jan. 6, 2009

(86) PCT No.: PCT/JP2009/050035
§ 371 (c)(1),
(2), (4) Date: Jul. 6, 2010

(87) PCT Pub. No.: WO2009/087992
PCT Pub. Date: Jul. 16, 2009

(65) Prior Publication Data
US 2010/0281431 A1    Nov. 4, 2010

(30) Foreign Application Priority Data

Jan. 7, 2008   (JP) ................................. 2008-000761

(51) Int. Cl.
*G06F 3/048*   (2013.01)
*H04M 1/725*   (2006.01)
(Continued)

(52) U.S. Cl.
CPC ........... *H04M 1/7258* (2013.01); *G06F 3/0489* (2013.01); *H04M 1/22* (2013.01)
USPC ......................................................... 715/835

(58) Field of Classification Search
CPC .................. G06F 3/04886; G06F 2200/1614; G06F 1/1664; G06F 3/04897; H04M 1/2472
USPC .......................................................... 715/835
See application file for complete search history.

(56) References Cited

U.S. PATENT DOCUMENTS

| | | | | |
|---|---|---|---|---|
| 5,737,394 | A * | 4/1998 | Anderson et al. | 379/88.11 |
| 6,332,024 | B1 * | 12/2001 | Inoue et al. | 379/433.06 |
| 7,242,385 | B2 * | 7/2007 | Kojo | 345/156 |

(Continued)

FOREIGN PATENT DOCUMENTS

| | | |
|---|---|---|
| EP | 1821177 A1 | 8/2007 |
| JP | 09-120352 | 5/1997 |

(Continued)

OTHER PUBLICATIONS

Yuan, Nokia Smartphone Hacks, Chapter 3, pp. 87-88, 2005.*

(Continued)

*Primary Examiner* — Jennifer To
*Assistant Examiner* — Joseph R Burwell
(74) *Attorney, Agent, or Firm* — MKG, LLC

(57) ABSTRACT

An information processing device displays in a display area a key image indicating an associated key to which a process is allocated as a soft key. In the information processing device, a key to which a process is allocated can be changed. The information processing device changes what is displayed based on the display mode. For example, if processes are allocated to a key, the information processing device displays an associated key image. If the user desires to change the orientation of the device, the key and associated key image and allocated process can be changed.

10 Claims, 10 Drawing Sheets

(a)    (b)

(51) Int. Cl.
*G06F 3/0489* (2013.01)
*H04M 1/22* (2006.01)

(56) References Cited

U.S. PATENT DOCUMENTS

| | | | |
|---|---|---|---|
| 7,388,578 B2* | 6/2008 | Tao | 345/173 |
| 7,546,555 B2* | 6/2009 | Guo et al. | 715/864 |
| 8,797,267 B2* | 8/2014 | Duarte et al. | 345/169 |
| 2003/0130014 A1* | 7/2003 | Rucinski | 455/566 |
| 2005/0090288 A1* | 4/2005 | Stohr et al. | 455/566 |
| 2006/0005131 A1* | 1/2006 | Tao | 715/702 |
| 2007/0257889 A1* | 11/2007 | Croy | 345/170 |
| 2008/0014987 A1* | 1/2008 | Kusuda et al. | 455/556.1 |
| 2008/0188272 A1* | 8/2008 | Ohmoto | 455/575.1 |
| 2009/0227279 A1* | 9/2009 | Yuki et al. | 455/550.1 |
| 2010/0262493 A1* | 10/2010 | Tahkokallio et al. | 705/14.53 |

FOREIGN PATENT DOCUMENTS

| | | |
|---|---|---|
| JP | 2004-135118 | 4/2004 |
| JP | 2005-122499 | 5/2005 |
| JP | 2005-141541 | 6/2005 |
| JP | 2005-318164 | 11/2005 |
| JP | 2006-018713 | 1/2006 |
| JP | 2007-018423 | 1/2007 |
| JP | 2007-504508 | 3/2007 |
| JP | 2007-164733 | 6/2007 |
| WO | 2005/041546 A2 | 5/2005 |
| WO | WO2005/125159 A1 * | 12/2005 ............ H04M 1/247 |

OTHER PUBLICATIONS

NEC Dterm Series i/Dterm IP User's Guide, Sep. 2002.*
Chinese Office Action for Chinese Patent Application CN 200980101803.3, dated Jan. 4, 2012 with English translation.
Communication pursuant to Article 94(3) for European Application No. 09700366.9-2414 dated Apr. 23, 2012.
Office Action for Chinese Patent Application No. 200980101803.3 with English translation dated May 15, 2012.
Supplementary European Search Report dated Mar. 29, 2012; issued in conjunction with European Patent Application No. 09700366.9.
Notice of Reasons for Rejection for Japanese Patent Application No. 2009-548913; date mailed Jan. 22, 2013; pp. 1-3.
Decision of Refusal for corresponding JP Application No. 2009-548913, date mailed Aug. 27, 2013, pp. 1-2.

* cited by examiner

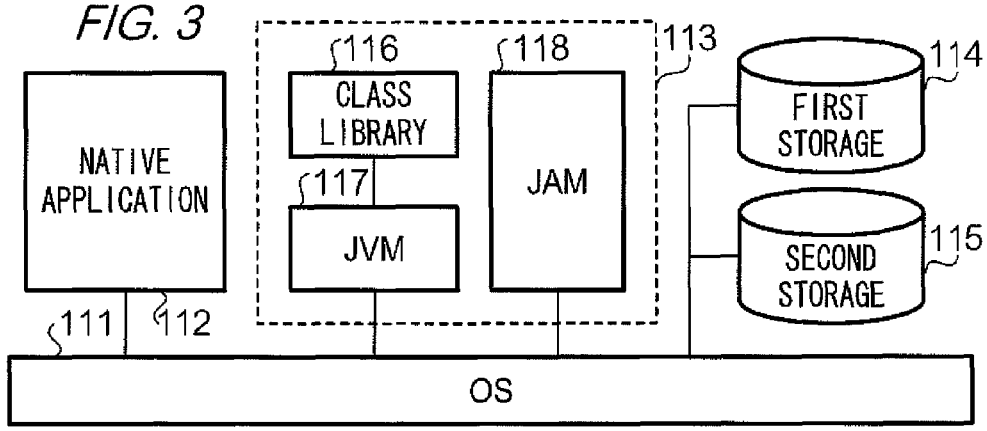
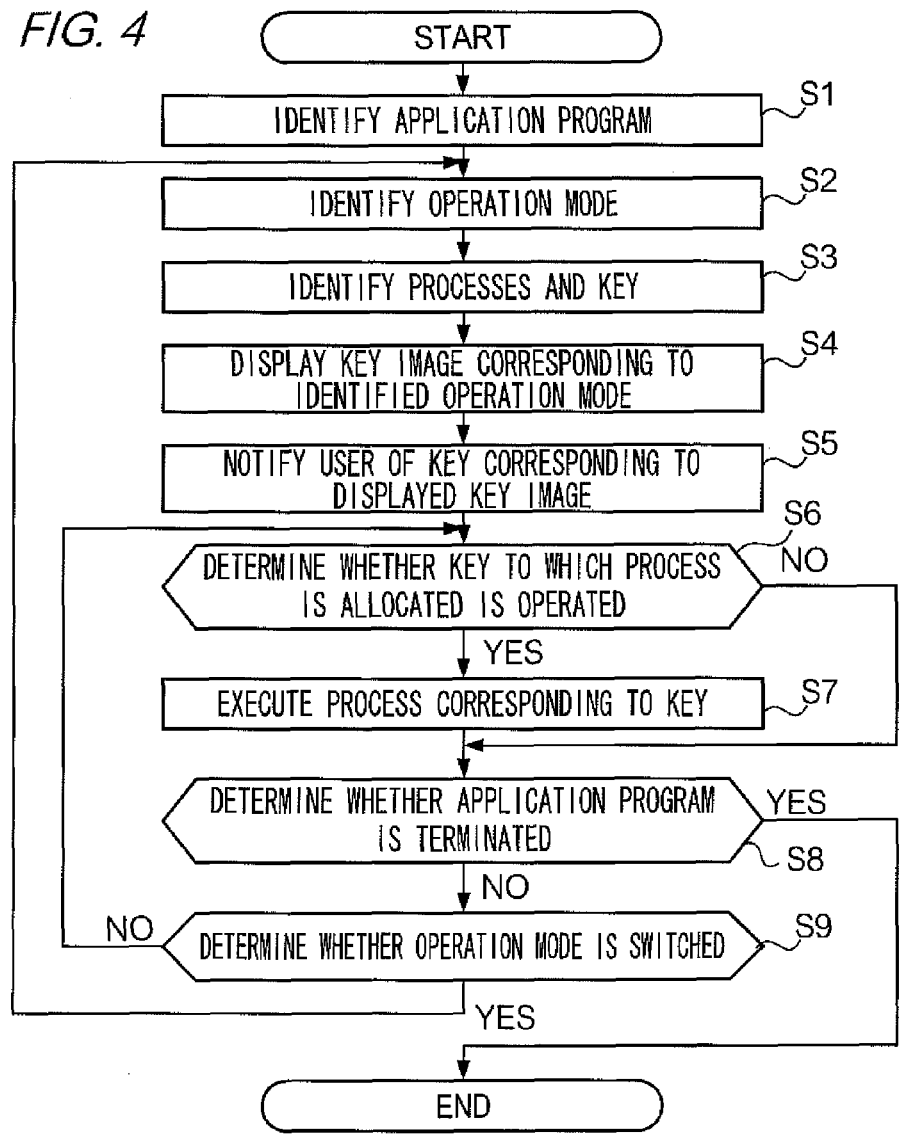

FIG. 5
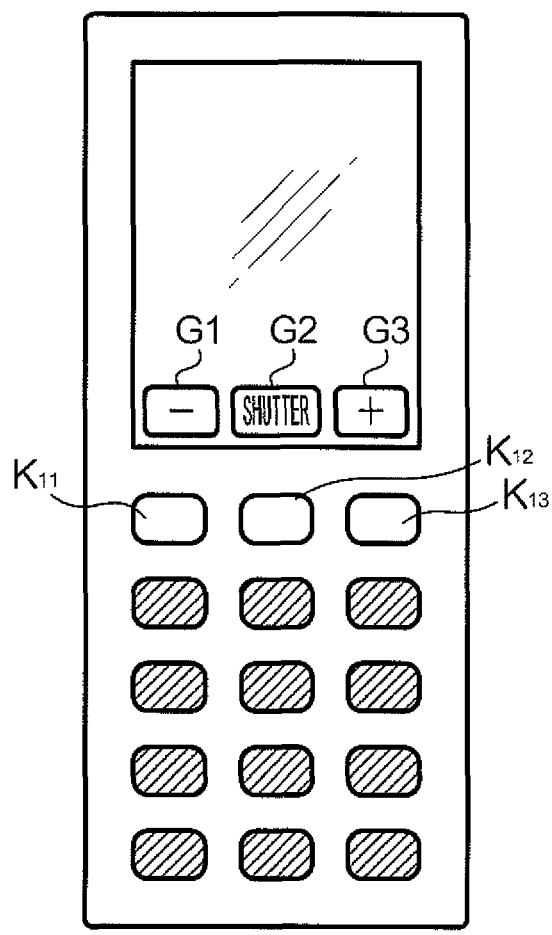
(a)
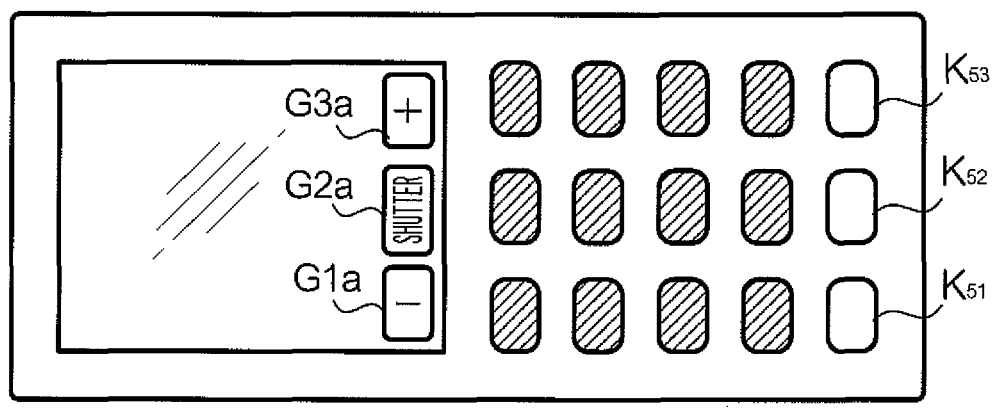
(b)

(a)  (b)

FIG. 7
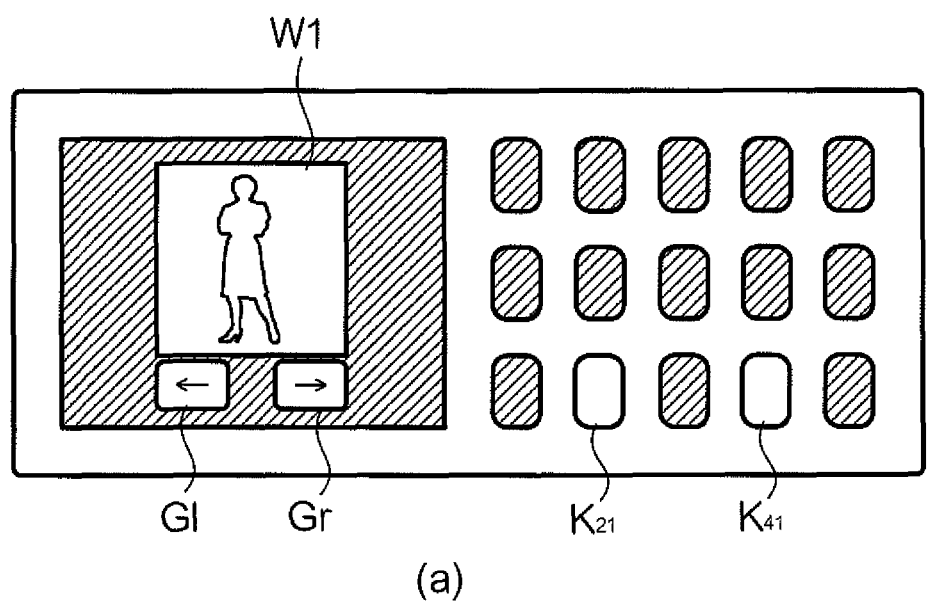
(a)
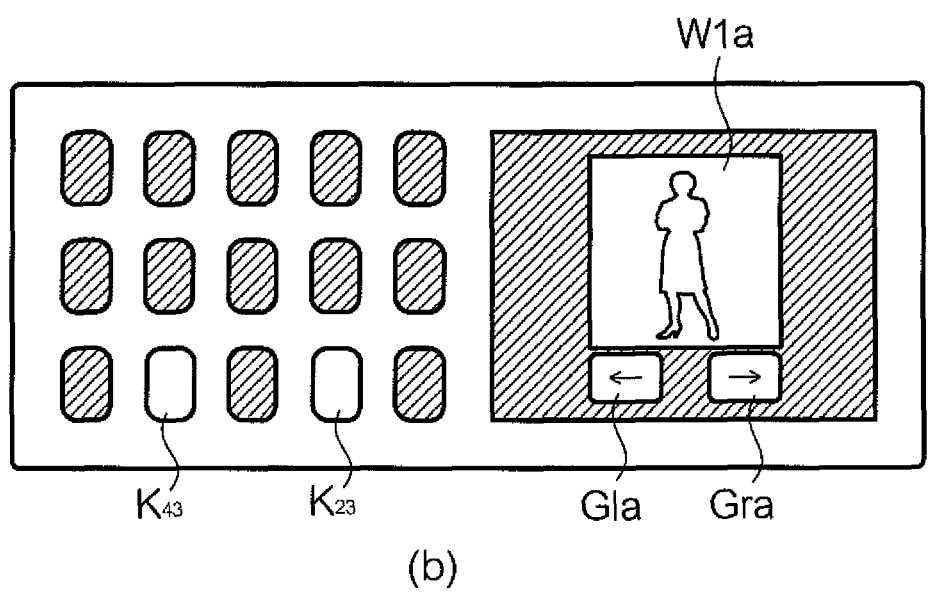
(b)

DYNAMIC SOFT KEY ARRANGEMENT BASED ON PHONE ORIENTATION AND USER PREFERENCES

The present invention relates to a technology to enable a user to recognize a key to which a function is allocated.

BACKGROUND

A technology for allocating plural functions to a key is known (for example, refer to Japanese Patent Publication No. 09-120352 to Seki et al.). Such a technology is used for an information processing device such as a mobile phone, which has fewer keys than the number of functions to be implemented using the keys. Such a key is referred to as a "soft key" or "software key" because a function allocated to the key is determined depending on software in use.

To allocate plural functions to a key, a function currently allocated to the key is displayed, as disclosed in Japanese Patent Publication No. 09-120352 to Seki et al. According to this technology, a user can recognize a function currently allocated to the key.

SUMMARY

Generally, soft keys are positioned at a predetermined position. For example, in a mobile phone, the soft keys are positioned between a display and a ten-keypad (for inputting characters or numbers).

However, in a case that the position of the soft keys is fixed, a user might find it difficult to operate the soft keys. For example, different key layouts are suitable for right-handed and left-handed users. For example, some users prefer to hold the vertical mobile phone in a horizontal position, while others prefer that the position of the display screen and the keys on the vertical mobile phone is switched, so that the keys are above and the display is below.

The invention enables a changeable relationship to be made between the functions of the keys depending on a user's requirements, and enables the user to identify the changed relationship.

According to one aspect of the invention, there is provided an information processing device including: allocating means for allocating a process to be executed, to at least one of a plurality of keys; display control means for displaying on a display area a key image indicating a key to which the process is allocated by the allocating means; process control means for instructing to execute the process if the key to which the process is allocated is selected; changing means for changing a key to which the process is allocated, wherein the display control means is configured to change the display mode of the key image when the changing means changes the allocation.

According to the information processing device, a relationship between a function and a key can be changed depending on a user's requirement and the user can identify the relationship easily.

It is preferred that the plurality of keys are positioned at a predetermined position, the display control means is configured to display the key image at a predetermined position in the display area, and change the position of the key image when the changing means changes the allocation.

It is preferred that the allocating means is configured to allocate each of a plurality of processes to each of a plurality of keys, the display control means is configured to display the key image indicating the plurality of keys to which the plurality of processes is allocated, depending on a layout of the plurality of keys, and the changing means is configured to change the keys to which the plurality of processes is allocated.

It is preferred that the information processing device further includes notifying means for notifying a user of the key to which the process is allocated by the allocating means, so as to distinguish the key from other keys.

It is preferred that the notifying means is configured to notify a user of the key to which the process is allocated by displaying a color or fight, and the display control means is configured to display the key image notified by the notifying means.

It is preferred that if the information processing device includes a plurality of keys, the notifying means is configured to notify each of the plurality of keys in a different way.

It is preferred that the information processing device further includes detecting means for detecting a direction of the information processing device, wherein the changing means is configured to change the key allocation when the detecting means detects a change in the direction.

It is preferred that the information processing device further includes a transformable body, and detecting means for detecting transformation of the transformable body, wherein the changing means is configured to change the key allocation when the detecting means detects the transformation.

It is preferred that the information processing device further includes detecting means for detecting a display direction in the display area, wherein the changing means is configured to change the key allocation when the detecting means detects the change in the display direction.

It is preferred that the display control means is configured to display a window in a part of the display area and the key image beside the window, the window corresponding to the process.

According to another aspect of the invention, there is provided a program for causing a computer device to execute a process, the process including: allocating a process to be executed to at least one of a plurality of keys; displaying in a display area a key image indicating a key to which the process is allocated; instructing to execute the process if the key to which the process is allocated is selected; changing a key to which the process is allocated; and changing the display mode of the key image when the changing means changes the allocation.

BRIEF DESCRIPTION OF THE DRAWINGS

The invention will be described with reference to the accompanying drawings, wherein like numbers reference like elements:

FIG. 3 shows a logical configuration of the information processing device;

FIG. 4 shows a flow chart illustrating a process executed by the information processing device;

FIGS. 5(a) and 5(b) show examples of display by the display unit and notification by the notification unit;

FIGS. 7(a) and 7(b) show examples of display by the display unit and notification by the notification unit;

DETAILED DESCRIPTION

Figure 1:
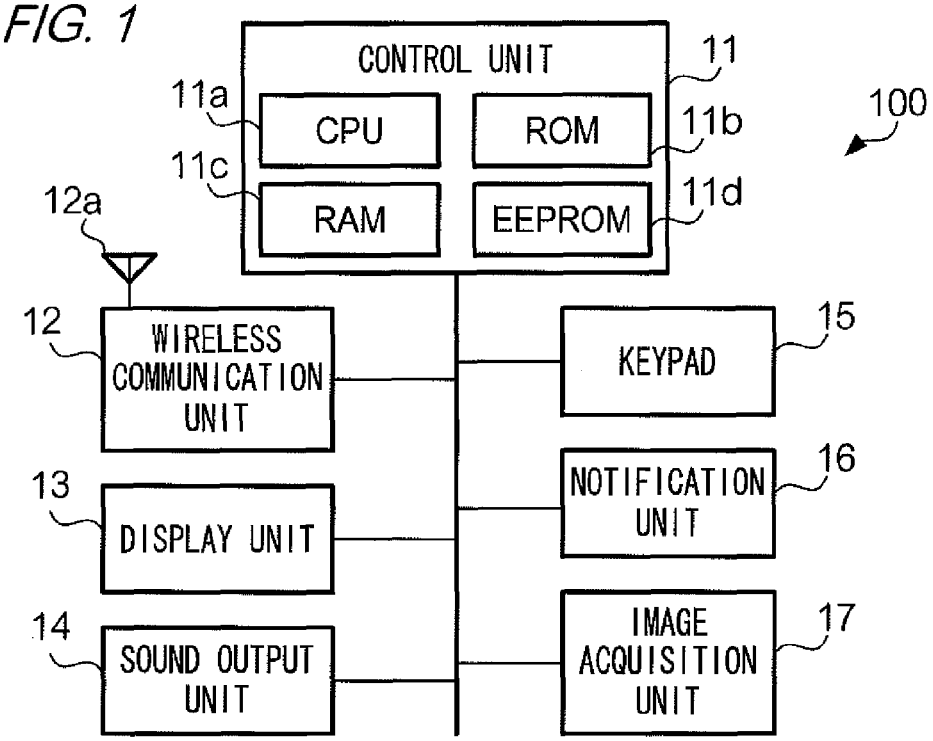
FIG. 1 shows a block diagram illustrating a configuration of an information processing device according to an exemplary embodiment of the invention.

FIG. 1 shows a block diagram illustrating an overall configuration of an information processing device according to an exemplary embodiment of the invention. As shown in FIG. 1, an information processing device 100 includes a control unit 11, a wireless communication unit 12, a display unit 13, a sound output unit 14, a keypad 15, a notification unit 16, and an image acquisition unit 17. In the present exemplary embodiment, the information processing device 100 is a mobile phone.

The control unit 11 includes a CPU (Central Processing Unit) 11a, a ROM (Read Only Memory) 11b, RAM (Random Access Memory) 11c, and EEPROM (Electronically Erasable and Programmable ROM) 11d. The CPU 11a executes a program stored in the ROM 11b or the EEPROM 11d by using the RAM 11c as a work area. By executing the program, the control unit 11 controls an element of the information processing device 100. The wireless communication unit 12 includes an antenna 12a, and performs wireless data communication with a mobile communication network. The display unit 13 includes a liquid crystal display and a driver circuit, and displays in a predetermined display area an image on the basis of display data provided by the control unit 11. The sound output unit 14 includes a speaker and outputs a sound depending on sound data provided by the control unit 11.

The keypad 15 includes plural keys, and outputs a signal to the control unit 11, based on an operation performed by a user. The notification unit 16 includes display devices corresponding to each key of the keypad 15. The notification unit 16 notifies a key by causing a display device to emit light in response to an instruction from the control unit 11. The display device of the notification unit 16 can emit light of a specific color, which can be changed. For example, the notification unit 16 includes a red LED (Light Emitting Diode), a green LED, and a blue LED. The notification unit 16 can change the color of light to be emitted by controlling intensities of the LEDs.

The image acquisition unit 17 includes a CMOS (Complementary Metal Oxide Semiconductor) image sensor, and functions as a camera. In the present exemplary embodiment, the image acquisition unit 17 has a zoom function. An imaging device of the image acquisition unit 17 is provided at an opposite side of the keypad and a display area of the information processing device 100 so that a user can take a picture by using the display area of the display unit 13 as a viewfinder and operating the keypad 15. It is to be noted that the configuration of the image acquisition unit 17 is not restricted to the example.

Figure 2:
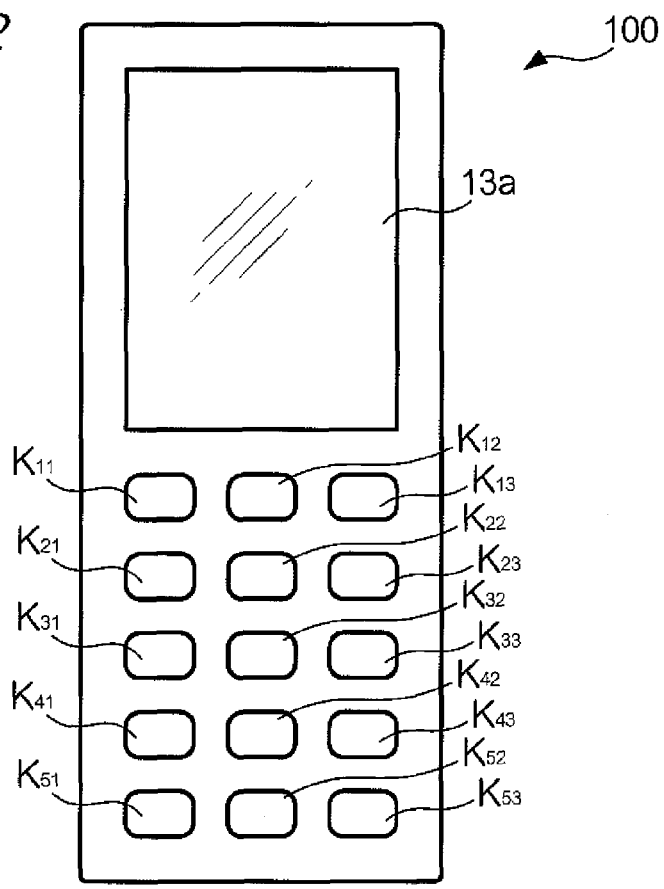
FIG. 2 schematically shows an external front view of the information processing device.

FIG. 2 schematically shows an external front view of the information processing device 100. More specifically, FIG. 2 shows the display area of the display unit 13 and the keys of the keypad 15. As shown in FIG. 2, the information processing device 100 includes a display area 13a and plural keys $K_{11}, K_{12}, \ldots,$ and $K_{53}$. The display area 13a includes plural pixels, which are laid out in a matrix of plural lines and plural columns and can show an image by controlling a tone of the pixels depending on the display data. The keys of the keypad 15 are laid out in 5 lines and 3 columns. For at least one of these 15 keys, a function corresponding to an application program is allocated.

Each key of the keypad 15 has a transparent area in at least a part of the key, and light from inside the device shows through the transparent area. A display device of the notification unit 16 is inside the device and irradiates light so as to show a color through a key. For example, when a display device corresponding to a key irradiates red light, the key appears red to a user.

The ROM 11b stores plural programs in advance. Hereinafter, these programs are referred to as "preinstalled programs." More specifically, the preinstalled programs include a multi-task operating system (hereinafter referred to as a "multi-task OS"), a Java® (registered trademark) platform, and native application programs. The multi-task OS is an operating system that supports allocating virtual memory spaces used for performing virtual parallel processing of plural tasks by TSS (Time-Sharing System). The Java® platform includes programs described in accordance with CDC (Connected Device Configuration), which is a configuration for implementing a Java® runtime environment 113 in the information processing device 100. The native application programs include a program for implementing a basic function in the information processing device 100, such as a telephone call.

The EEPROM 11d has a Java® application program storage area for storing Java® application programs. A Java® application program includes a JAR (Java® Archive) file and an ADF (Application Descriptor File) file. The JAR file includes a program body, image files, and sound files. The program body includes codes for implementing a process under the Java® runtime environment. The image files and the sound files are used for the process. The ADF includes descriptions for installation and execution of the JAR file and descriptions of various attributes. A Java® application program is generated by a contents provider or a communication carrier and is stored in a server device. The Java® application program can be downloaded from the server device in response to a request from the information processing device 100.

FIG. 3 shows a logical configuration of the control unit 11 in the information processing device 100 in accordance with a program stored in the ROM 11b and the EEPROM 11d. As shown in FIG. 3, in the information processing device 100, a native application 112 and the Java® runtime environment 113 are implemented on an OS 111. Also, a first storage 114 and a second storage 115 are implemented in the EEPROM 11d.

The Java® runtime environment 113 is implemented by a Java® platform in the ROM 11b. The Java® runtime environment 113 includes a class library 116, JVM (Java® Virtual Machine) 117, and JAM (Java® Application Manager) 118. The class library 116 is a file in which plural program modules (classes) are combined. The JVM 117 is a Java® runtime environment optimized for the CDC, and functions to interpret and execute byte codes described in the Java® application program. The JAM 118 functions to control downloading, installing, initiating, or quitting the Java® application program.

The first storage 114 includes a storage area for storing a downloaded Java® application program (a JAR file and an ADF) under control of the JAM 118. The second storage 115 includes a storage area for storing data generated by the Java® application program after termination of the Java® application program. A unique storage area is allocated for each of the installed Java® application programs. Data in a storage area allocated for a single Java® application program can be rewritten while the Java® application program is being executed and cannot be rewritten by another Java® application program.

The configuration of the information processing device 100 is as described above. According to the configuration, the information processing device 100 executes plural application programs in response to an instruction by a user. The user inputs an instruction to the information processing device 100 to execute an application program by operating the keypad 15.

The information processing device 100 allocates a process to a key of the keypad 15, in response to execution of an application program. The information processing device 100 displays an image showing a key to which the process is allocated (hereinafter, the image is referred to as a "key image"). The information processing device 100 can change the allocation of the process depending on a situation. Here, allocating a function to a key and displaying a key image are described by way of examples of some application programs. In the present exemplary embodiment, a "digital still camera," a "movie player," and a "game," are examples of application programs. Each of these application programs may be a native application program or a Java® application program.

The "digital still camera" is an application program for generating image data (a picture) by using the image acquisition unit 17. While the "digital still camera" is being executed, the functions of changing zoom to a wide-angle view, or a telescopic view, and a process for acquiring an image (in other words, corresponding to so-called shutter operations) are allocated to soft keys.

Further, the "digital still camera" can be executed in two operational modes including "longitudinal mode" and "horizontal mode." Here, the "longitudinal mode" refers to an operation mode in which the information processing device 100 is held vertically by a user as shown in FIG. 2, while the "horizontal mode" refers to an operation mode in which the information processing device 100 is held horizontally by a user, rotating the information processing device 100 by 90 degrees from a state shown in FIG. 2.

The "movie player" is an application program for obtaining music data via the wireless communication unit 12, converting the music data into sound data, and controlling the sound output unit 14 to output the sound. While the "movie player" is being executed, the processes for playing or stopping the music, rewinding or fast-forwarding the music, and increasing or decreasing the volume level, are allocated to soft keys.

Further, the "movie player" can be executed in two operational modes, which include a "right-alignment mode" and a "left-alignment mode." Here, the "right-alignment mode" refers to an operation mode in which the soft keys are aligned at the right side of the information processing device 100 as viewed from the front, while the "left-alignment mode" refers to an operation mode in which the soft keys are aligned to the left side of the information processing device 100 as viewed from the front.

The "game" is an application program enabling a user to move a character shown in a window in a left/right direction. While the "game" is being executed, processes for moving the character toward right or left are allocated to soft keys. In the present exemplary embodiment, the information processing device 100 is held horizontally when a user plays the "game."

Further, the "game" can be executed in two operational modes including "right-hand mode" and "left-hand mode." Here, the "right-hand mode" refers to an operational mode in which the keys are located at the right side and the display area is located at the left side, while the "left-hand mode" refers to an operation mode in which the keys are located at the left side and the display area is located at the right side.

A user can select an operation mode to be activated. Each application program has a default operation mode. The default operation mode may be, for example, an operation mode that was selected last when the application program was previously executed, or an operation mode that is predetermined or is not dependent on a user's operation. Information regarding the default operation mode (hereinafter, the information is referred to as "mode configuration information") is stored in a unique storage area of the application program, and can be read by the control unit 11.

Allocation of a process to keys is determined depending on an operation mode of the application program. Information regarding the allocation (hereinafter, the information is referred to as "allocation configuration information") is stored in a unique storage area of the application program, and can be read by the control unit 11.

FIG. 4 shows a flow chart illustrating a process executed by the information processing device 100. The process is performed when the information processing device 100 initiates an application program. Alternatively, the process may be performed when an active application is switched in a case that the information processing device 100 executes plural application programs. Here, "active application" refers to an application program to which an input focus is given. Hereinafter, operation of the information processing device 100 will be described with reference to FIG. 4.

First, the control unit 11 of the information processing device 100 identifies an application program that is currently being executed (in step S1). If the information processing device 100 is executing plural application programs, an active application is identified in step S1. Then, the control unit 11 identifies an operation mode to be activated for the identified application program (in step S2). The control unit 11 identifies processes allocated to soft keys and the key to which configuration information is allocated (in step S3). The processes in steps S2 and S3 are executed with reference to the mode configuration information and the allocation configuration information.

According to the processes, the control unit 11 determines a key image to be displayed and a position at which the key image is displayed. The control unit 11 generates image data based on the determination and controls the display unit 13 to display the key image corresponding to the identified operation mode of the application program (in step S4). The control unit 11 provides an instruction to the notification unit 16 so as to notify a user of a key corresponding to the displayed key image (in step S5).

Here, it is preferred that the control unit 11 controls the key image and a notification of the key to synchronize with each other. For example, when the key image is indicated by blinking, the key may show a blinking light. Alternatively, when the key image is displayed in a specific color, the key may show in that color.

The control unit 11 determines whether an operation signal is provided to show that a key to which a process is allocated is operated (in step S6). In this step, the control unit 11 may ignore an operation signal showing that a key to which a process is not allocated is operated. If an operation signal is provided to show that a key to which a process is allocated is operated (step S6: YES), the control unit 11 instructs the application to execute the process corresponding to the key (in step S7). If such an operation signal is not provided (step S6: NO), the control unit 11 skips the process in step S7.

Next, the control unit 11 determines whether the application program identified in step S1 is terminated (in step S8). If the information processing device 100 is executing plural application programs, it is instead determined in step S8 whether the application program identified in step S1 is inactive. If the control unit 11 determines that the application program is terminated (or is inactive) (step S8: YES), the control unit 11 terminates the process.

If the control unit 11 determines that the application program is not terminated (or is still active) (step S8: NO), the control unit 11 determines whether the operation mode is switched (in step S9). If the user did not switch the operation mode (step S9: NO), the control unit 11 executes the processes in steps S6-S9. If the user switched the operation mode (step S9: YES), the control unit 11 proceeds to the process of step S2.

The foregoing is a brief outline of the operation of the information processing device 100. Next, operation of the information processing device 100 is described in detail with examples of display and notification in the application programs.

First, description is given for an example of an application program of a "digital still camera" in which the operation mode is changed from the "longitudinal mode" (default) to the "horizontal mode." In this case, the display unit 13 displays an image shown in FIG. 5(a). In other words, the display unit 13 displays key images G1, G2, and G3. At this time, the notification unit 16 turns off the display devices corresponding to the keys K11, K12, and K13, as well as the other display devices. In this figure, a process for changing zoom to a wide-angle (−) view is allocated to the key K11, and a process for changing zoom to a telescopic (+) view is allocated to the key K13. Further, a shutter button is allocated to the key K12. In this figure, keys that are not lit are shown by hatching so as to distinguish them from those that are lit. This also applies to the other figures.

In FIG. 5(a), when the operation mode is switched from a "longitudinal mode" to a "horizontal mode," the notification unit 16 displays an image as shown in FIG. 5(b). At this time, the control unit 11 changes the key allocation from the keys K11, K12, and K13 to the keys K51, K52, and K53. When the key allocation is changed, the notification unit 16 turns on the display devices corresponding to the keys K51, K52, and K53, and turns off the other display devices. In other words, for example, the shutter button is changed from the key K12 in the "longitudinal mode" to the key K52 in the "horizontal mode."

Further, at this time, the control unit 11 does not change the position of the key image, but changes a display mode (or display style) of the characters in the key image, to orient the characters to make them easily readable by a user. The key images G1a, G2a, and G3a show such an example.

Figure 6:
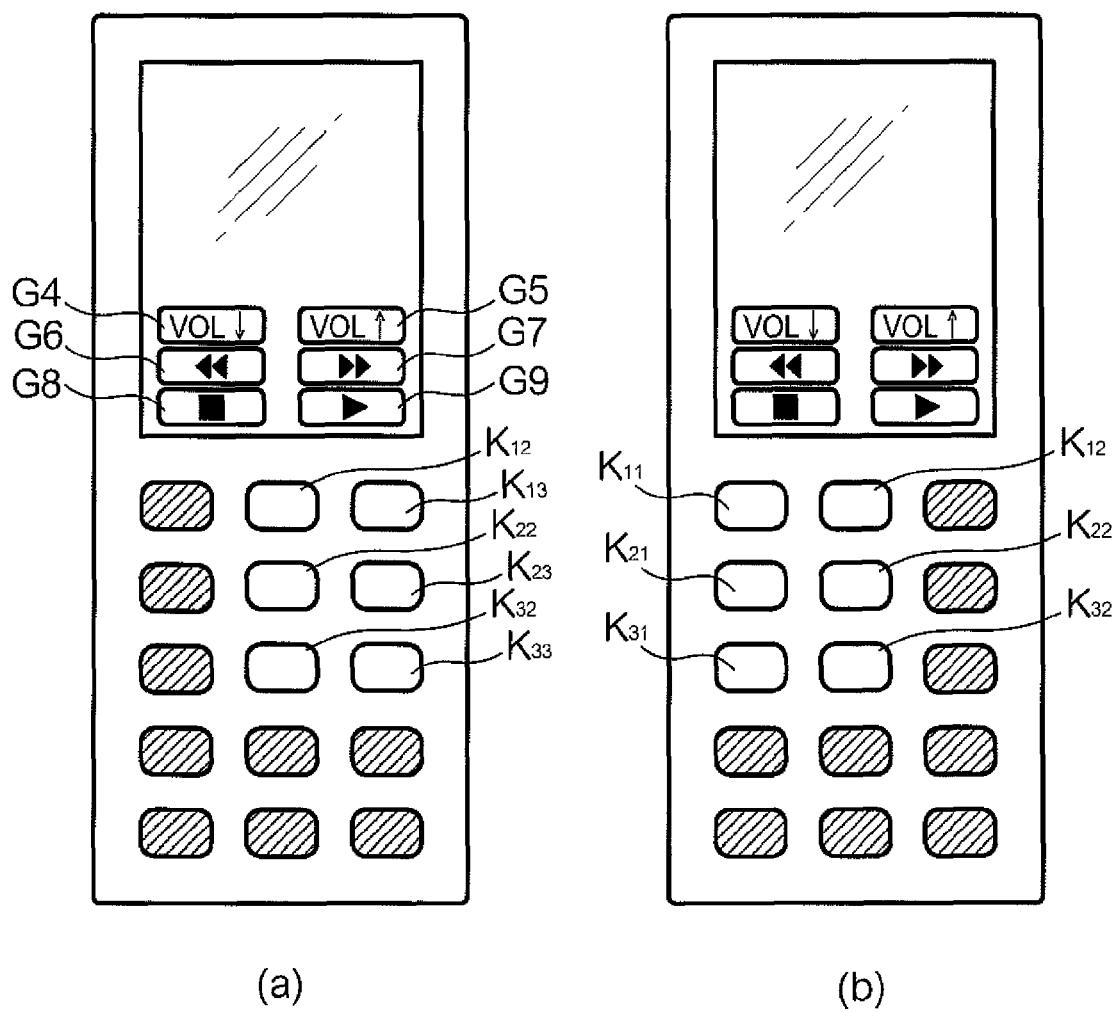
FIGS. 6(a) and 6(b) show examples of display by the display unit and notification by the notification unit.

Next, description is given for an example of an application program "movie player" in which the operation mode is changed from the "right-alignment mode" (default) to the "left-alignment mode." In this case, the display unit 13 displays an image shown in FIG. 6(a). In other words, the display unit 13 displays key images G4, G5, G6, G7, G8, and G9. At this time, the notification unit 16 turns on the display devices corresponding to the keys K12, K13, K22, K23, and K33, and turns off the other display devices. In this figure, the processes for increasing and decreasing the volume level are allocated to the keys K12 and K13, respectively. The processes for rewinding and fast-forwarding and decreasing the volume level are allocated to the keys K22 and K23, respectively. The processes for playing and stopping the music are allocated to the keys K32 and K33, respectively. The key images are laid out similarly to the keys to which processes are allocated.

In FIG. 6(a), if the operation mode is switched from the "right-alignment mode" to the "left-alignment mode," the notification unit 16 displays an image shown in FIG. 6(b). In other words, the control unit 11 changes the keys to which the processes are allocated, from the keys K12, K13, K22, K23, and K33 to the keys K11, K12, K21, K22, K31, and K32. When the key allocation is changed, the notification unit 16 turns off the display devices corresponding to the keys K13, K23, and K33, and turns on the display devices corresponding to the keys K11, K21, and K31. In other words, by changing the operation mode from the "right-alignment mode" to the "left-alignment mode," the soft keys shift to the left by one key in response to the change from the "right-alignment mode" to the "left-alignment mode."

In this case, the control unit 11 does not change the position and the display mode of the key images. In other words, in a case of a "movie player," the position and the display mode of the key image are constant regardless of the operation mode.

Next, description is given for an example of an application program "game" in which the operation mode is changed from the "right-hand mode" (default) to the "left-hand mode." In this case, the display unit 13 displays an image shown in FIG. 7(a). In other words, the control unit 11 provides image data for displaying an image in which a window W1 is displayed in the correct direction and the key image Gr ("moving right") is located at the right side of the key image G1 ("moving left") with the information processing device being held so that the keys are located at the left side of the display area. At this time, the notification unit 16 turns on the display device corresponding to the keys K21 and K41, and turns off the other display devices. In this figure, the processes for moving the characters to left and right are allocated to the keys K21 and K41, respectively.

Further, the control unit 11 controls the soft keys to be displayed in different colors so that the user can distinguish each of the soft keys. For example, the key K21 ("moving left") and the key K41 ("moving right") are shown as blue and red, respectively. In addition, the control unit 11 provides to the display unit 13 image data corresponding to the color of the soft keys. In this example, the key image G1, which corresponds to the key K21, and the key image Gr, which corresponds to the key 41, are displayed as blue and red, respectively.

In FIG. 7(a), when the operation mode is changed from the "right-hand mode" to the "left-hand mode," the notification unit 16 displays an image shown in FIG. 7(b). In response to changing of the operation mode, the control unit 11 changes the keys to which the processes are allocated, from the keys K21 and K41 to the keys K43 and K23. In response to changing of the key allocation, the notification unit 16 turns on the display device corresponding to the keys K23 and K43, and turns off the other display devices. In other words, the soft keys are allocated so that the soft key for moving a character to the left is at the left side of the soft key for moving a character to the right, regardless of the operation mode.

At this time, the control unit 11 switches the position of the image so that the displayed images are turned around. In other words, the control unit 11 switches the image in which the right side is in the upward direction as viewed from the front to the image in which the left side is in the upward direction as viewed from the front. A window W1a shows an image after switching. The key images are located above the window W1a similarly to an example shown in FIG. 7(a). Key images of G1a and Gra are shown as examples.

As is described above, according to the information processing device 100 of the present exemplary embodiment, the allocation of the soft keys is changed in response to the operation mode, and can be notified by lighting of the keys. Accordingly, a user can easily recognize a relationship between the keys and the processes if the relationship is changed.

For example, in the above example of a "digital still camera," the layout of the soft keys is constant regardless of a holding position of the information processing device 100. The center soft key functions as the shutter button and both the side soft keys perform the function of changing from zoom to another view. A user can operate the device as s/he would a regular digital camera regardless of the operation mode, and can operate the device by touch.

Further, a user operating the information processing device 100 by looking at both the keys and the display area can recognize the relationship between the keys and the processes from the relationship between the mode displayed by the display unit and notification by the notification unit 16. For example, in the above example of "game," since a soft key (or a key image) is shown by a unique color, which is different from other soft keys (key images), the key allocation can be clearly understood.

Figure 8:
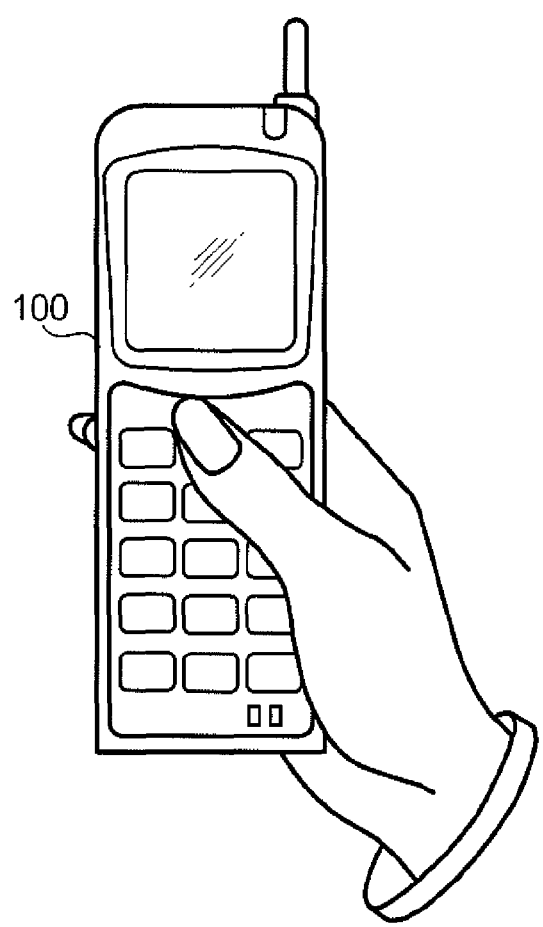
FIG. 8 shows an example of user's holding style of the information processing device.
Figure 9:
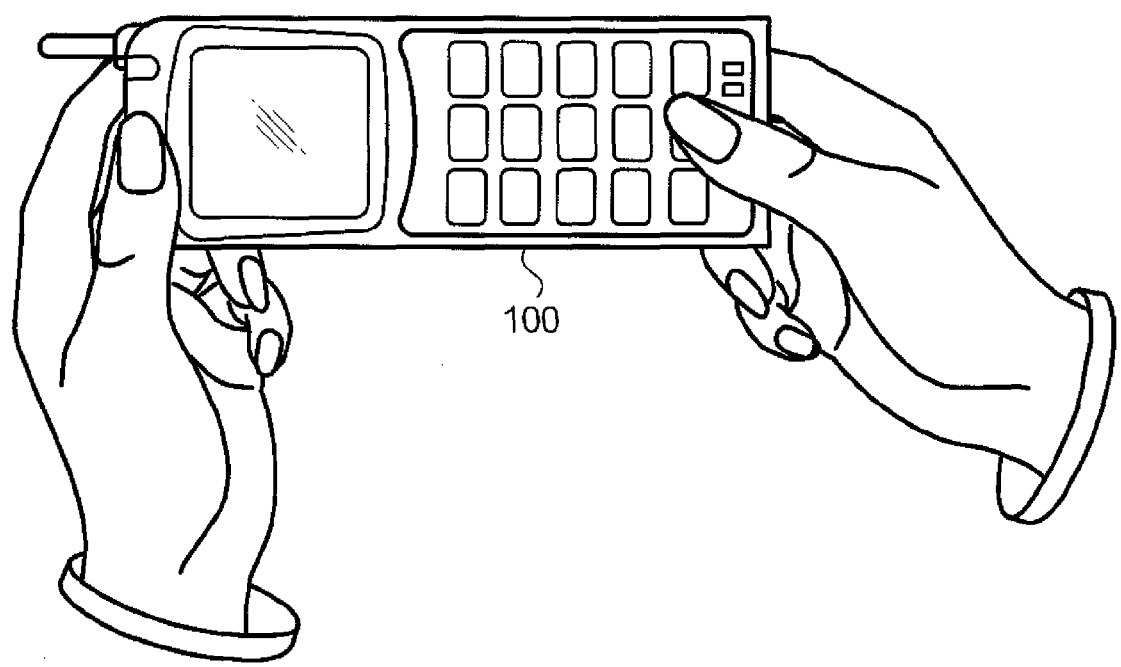
FIG. 9 shows an example of user's holding style of the information processing device.

Suitability of a key layout depends on a user's holding style of the information processing device. For example, if a user holds the information processing device 100 as shown in FIG. 8, it is easy for the user to push keys near the center (or keys near the display area). On the contrary, if a user holds the information processing device 100 as shown in FIG. 9, it is easier for the user to push keys near the edge than those near the center. Further, suitability of a key layout depends on which hand (right or left) the user uses to operate the information processing device 100. Alternatively, suitability of a key layout depends on a user's preference. According to the information processing device 100 of the present exemplary embodiment, since the key layout of the soft keys can be changed, the soft keys can be configured to a user's preference.

The invention is not restricted to the above exemplary embodiment. The invention can be implemented using one of the following modifications or two or more of the following modifications combined.

First Modification

The operation mode may be changed regardless of a user's selection. For example, in the example of the "digital still camera" or "game", the information processing device 100 may include a gravity sensor (or an acceleration sensor) for detecting a direction of the device and the control unit 11 may switch the operation mode in response to the detected direction. Alternatively, for the example of "game", the information processing device 100 may detect the correct direction (which direction is up) of a window from the image data, and the control unit 11 may switch the operation mode in response to the detected direction.

Second Modification

The display mode of the key image is not restricted to the above exemplary embodiment. For example, although the key image includes characters in the exemplary embodiment, the key image may not include characters. Alternatively, the key image may have a shape similar to the corresponding key.

Alternatively, the key image may not be displayed. For example, if a character is printed on a key, information indicating a relationship between the key and the process may be displayed instead of the key image. For example, if a key corresponding to the shutter button shows a printed character "A", information such as "shutter button is A" may be displayed somewhere in the display area.

Third Modification

The key layout is not restricted to that described in the exemplary embodiment. A number of keys or size of the keys may be designed differently. The keys to which the processes are allocated may be located other than on a front panel. For example, some mobile phones have keys at a side of the body (so-called side keys). Processes may be allocated to the side keys. For such a case, information such as "shutter button is a side key" may be displayed, similarly to the second embodiment.

Fourth Modification

Notification of a key is not restricted to illumination of the key. Notification of a key may be by any other process as long as the key to which a process is allocated can be distinguished from other keys. For example, instead of a key, an area around a perimeter of the key may be illuminated. Alternatively, notification may be performed not only by a visual indication such as a color or a light, but also by sound.

Alternatively, the display device of the key may be controlled to blink in a given pattern. In such a case, the key image may blink in synchronization with blinking of the key.

The display device of the notification unit 16 may be a liquid crystal display device, or an organic electro-luminescence device. The keypad 15 and the notification unit 16 may be a touch screen (or a touch panel).

Fifth Modification

Changing the key allocation may be initiated independently of changing of the operation mode. For example, the information processing device 100 may include means to allow a user to input an instruction to change the key allocation. According to such a configuration, the information processing device 100 can allocate keys in response to a user's instruction independently of changing of the operation mode.

Sixth Modification

The information processing device 100 may perform a control to display the window and the key images so that the window and the key images are located at a short distance— from each other—, in a case of an application program such as the above described "game" in which the window is displayed in a part of the display area. According to such a configuration, a user can recognize a relationship between the window and the soft key even if plural windows are displayed in the display area as in the multi-task environment.

If the information processing device 100 executes plural application programs, the soft keys may be allocated to each of the plural application programs. Further, in such a case, a key image corresponding to the key may be displayed at a short distance from a window corresponding to an application program. For example, a part of the keypad 15 is allocated to a process executed by a first application program and another part of the keypad 15 is allocated to a process executed by a second application program. According to such a configuration, a user can activate one of the plural application programs and control the application program to execute the required process.

Seventh Modification

Switching of the operation mode may be triggered in response to transformation of the information processing device 100. In such a case, the information processing device 100 can transform from a first form to a second form and the information processing device 100 has two operation modes, a first operation mode and a second operation mode corresponding to the first form and the second form, respectively.

Figure 10:
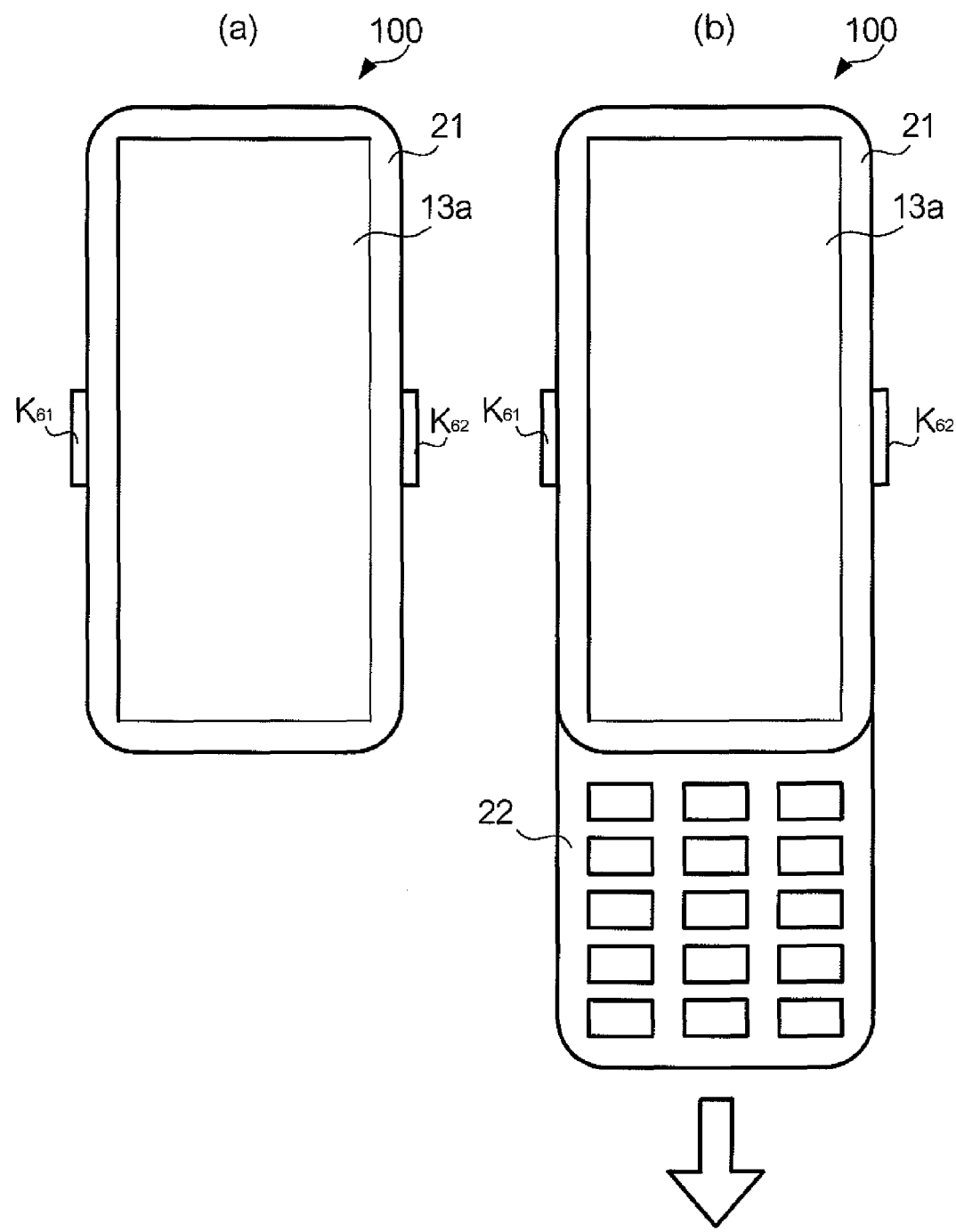
FIGS. 10(a) and 10(b) show another example of an external front view of the information processing device.

FIG. 10 shows another example of an external front view of the information processing device 100. The information processing device 100 is a mobile phone having a slidable keypad. The body of the information processing device 100 includes a body part 21 including the display unit 13 and a body part 22 including the keypad 15. The body part 22 is slidable relative to the body part 21. FIG. 10(a) shows the first form in which the body part 22 is housed under the body part 21. FIG. 10(b) shows the second form in which the body part 22 is extended from the body part 21. The body part 21 includes keys K61 and K62, which can be operated both in the first and the second form. The control unit 11 detects whether the information processing device 100 is in the form shown in FIG. 10(a) or in the form shown in FIG. 10(b). In other words, the information processing device 100 has a function to detect the transformation.

Figure 11:
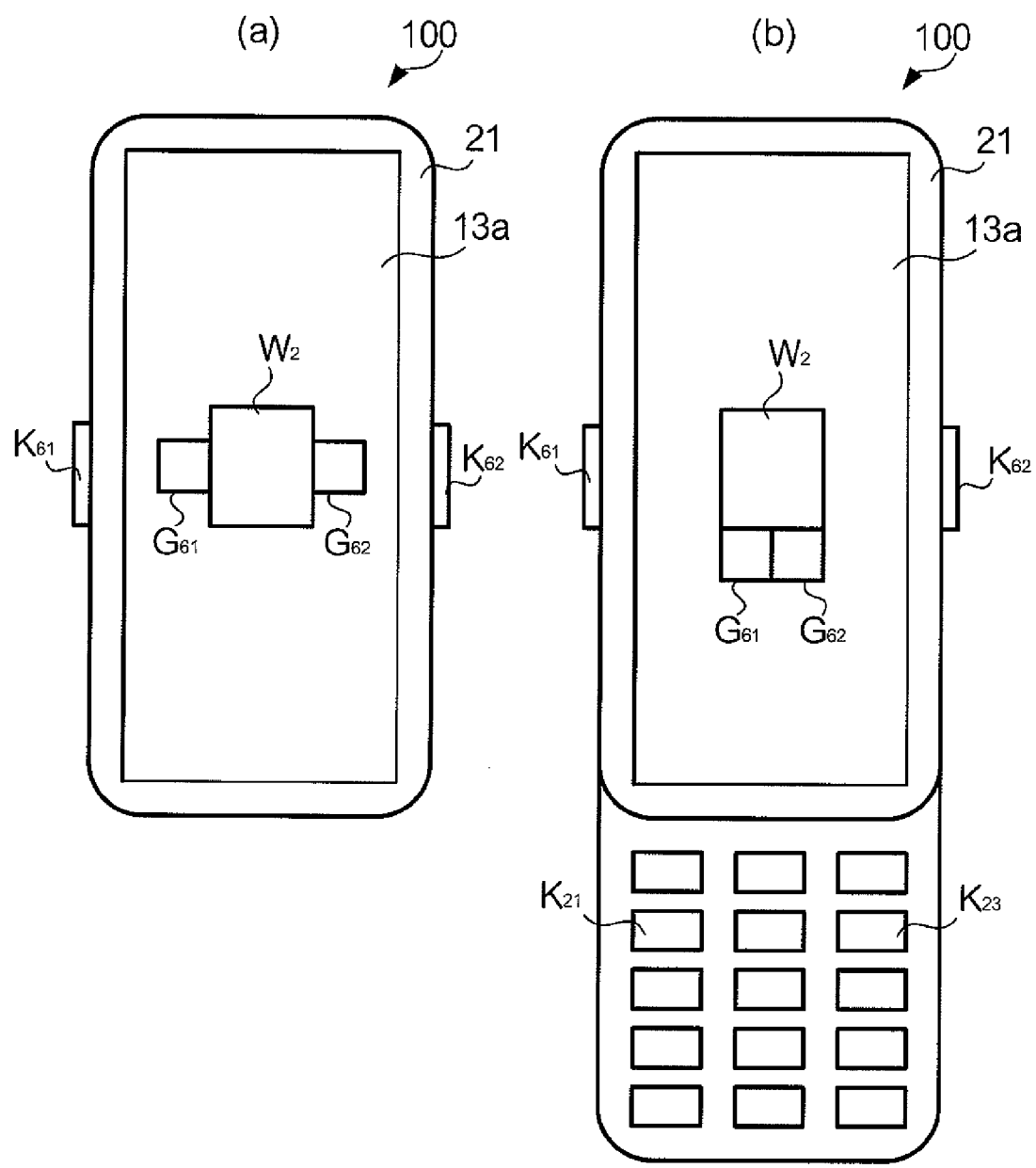
FIGS. 11(a) and 11(b) show an example of the soft keys in the seventh modification.

FIG. 11 shows an example of the soft keys in the seventh modification. In a state that the body part 22 is housed as shown in FIG. 10(a), in other words, in the first form, the operation mode is the first operation mode. In the first operation mode, processes are allocated to the keys K61 and K62 (FIG. 11(a)). In this form, key images G61 and G62 are displayed at both sides of the window W2 in the display area. The key images G61 and G62 correspond to the keys K61 and K62, respectively.

When the body part 22 is extended and the information processing device 100 undergoes transformation as shown in FIG. 10(b), the control unit 11 changes the operation mode from the first operation mode to the second operation mode. In the second operation mode, processes are allocated to the keys K21 and K23 (FIG. 11(b)). At this time, the position at which the key images G61 and G62 are displayed changes from the side of the window W2 to below the window W2. At this time, the key images G61 and G62 correspond to the keys K21 and K23.

Figure 12:
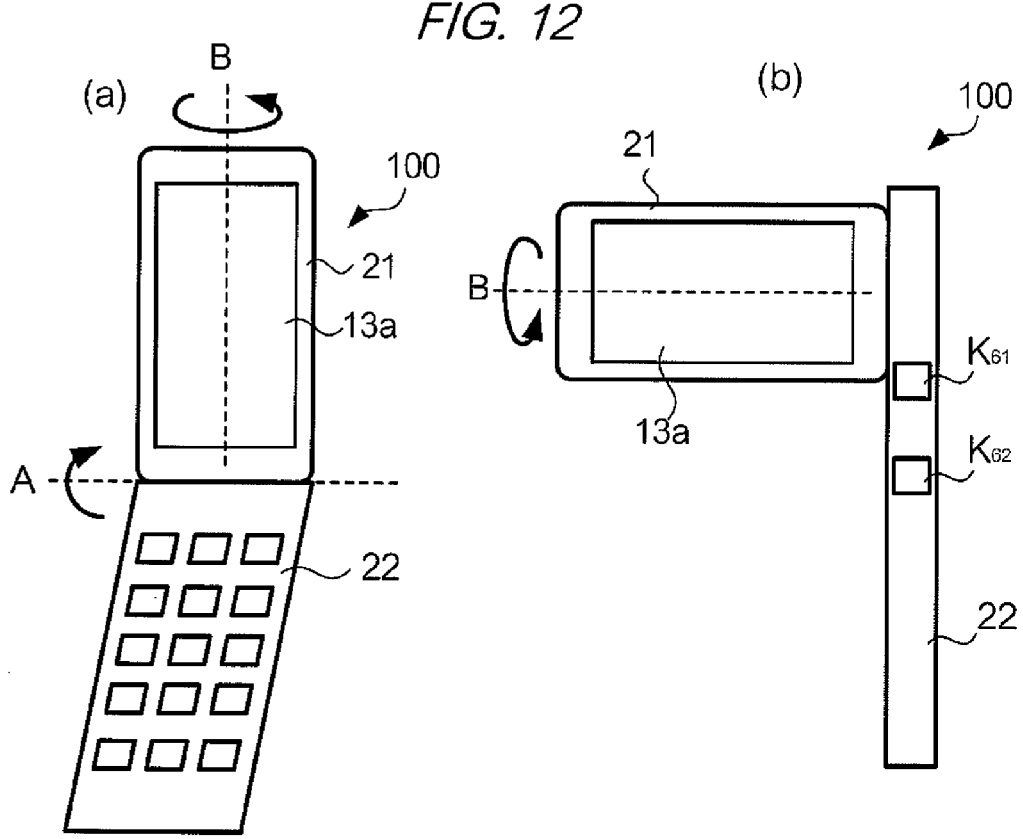
FIGS. 12(a) and 12(b) show still another example of an external front view of the information processing device 100.

FIG. 12 shows another example of an external front view of the information processing device 100. The information processing device 100 is a so-called folding type mobile phone. The body of the information processing device 100 includes the body part 21 including the display unit 13 and the body part 22 including the keypad 15. The body part 21 and the body part 22 are connected via a rotatable biaxial hinge (not shown in the figures). In other words, the body part 22 can rotate in relation to the body part 21, with axes A and B as axes of rotation, shown in FIG. 12. FIG. 12(a) shows the first form, which is a state in which the body part 22 rotates around the axis A from the folded form. FIG. 10(b) shows the second form, which is a state in which the body part 22 rotates around the axis B starting from the first form. The body part 21 has the keys K61 and K62, which are located on a different plane from the keys K11 to K53.

Figure 13:
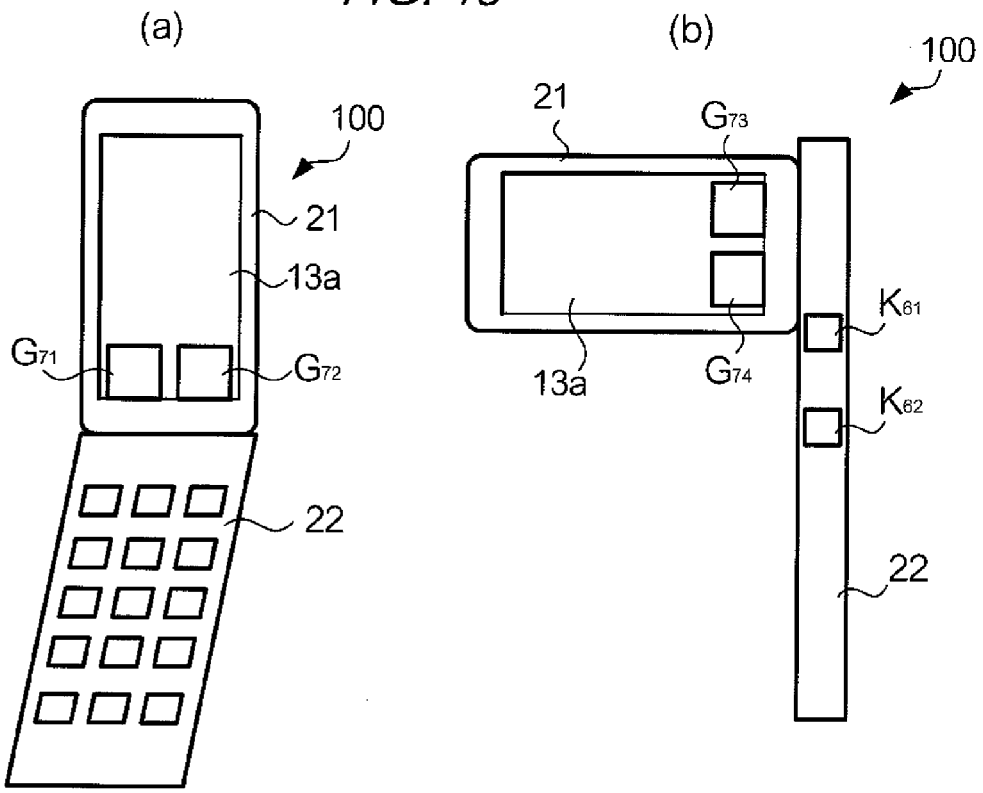
FIGS. 13(a) and 13(b) show an example of the soft keys in the seventh modification.

FIG. 13 shows an example of the soft keys in accordance with the seventh modification. In the first form shown in FIG. 12(a), the operation mode is the first operation mode. In the first operation mode, processes are allocated to the keys K11 and K13 (FIG. 13(a)). At this time, key images G71 and G72 are displayed in the display area. The key images G71 and G72 correspond to the keys K11 and K13, respectively.

When the information processing device 100 transforms into the second form as shown in FIG. 12(b), the control unit 11 switches the operation mode from the first operation mode to the second operation mode. In the second operation mode, processes are allocated to the keys K61 and K62 (FIG. 13(b)). At this time, key images G73 and G74 are displayed in the display area. The key images G73 and G74 correspond to the keys K61 and K62, respectively. At this time, the control unit 11 does not change the position of the key images but changes the display mode of characters in the key images so that the characters are in the correct direction even if the body part 22 is rotated.

Eighth Modification

Figure 14:
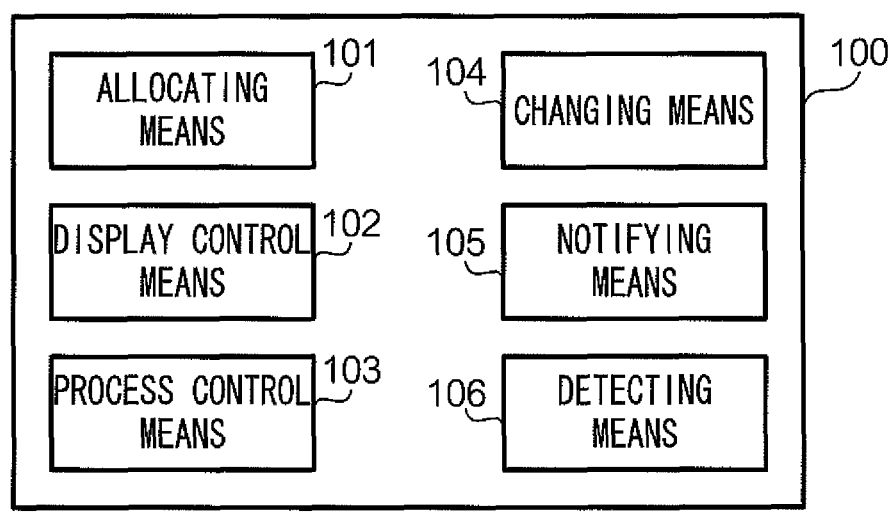
FIG. 14 shows a functional configuration of the information processing device.

FIG. 14 shows a functional configuration of the information processing device. An allocating means 101 allocates a process to be executed, to at least one of the plural keys. A display control means 102 controls the key image to be displayed in the display area. The key image indicating a key to which a process is allocated by the allocating means 101. A process control means 103 instructs to execute a process if a key to which the process is allocated by the display control means 102 is selected. A changing means 104 changes a key to which the process is allocated by the allocating means 101. Here, the display control means 102 controls the key image to be displayed depending on the change of the key allocation, when the changing means 104 changes the key allocation.

A notifying means 105 notifies a user of a key to which a process is allocated by the allocating means 101 so as to distinguish it from other keys. A detecting means 106 detects a direction of the information processing device 100 or that the information processing device 100 transforms. The changing means 104 may change the key allocation when the detecting means 106 detects a change in the direction or form of the information processing device 100. Further, at least one of the functional elements shown in FIG. 14 may be omitted.

In the above exemplary embodiment, the control unit 11 executing the operating system is an example of the allocating means 101, the display control means 102, the process control means 103, the changing means 104, and the detecting means 106. Each functional element corresponds to a module or a sub-routine of the operating system. Further, the notification unit 16 is an example of the notifying means 105. However, a relationship between the functional configuration and the hardware configuration is not restricted to the above exemplary embodiment. Each functional element may be implemented by any kind of hardware element (or a hardware element in cooperation with software). For example, each functional element may be implemented by a different control unit. Further, the hardware configuration of the information processing device 100 is not restricted to the configuration shown in FIG. 1. The information processing device 100 may include any kind of hardware configuration as long as a function required can be implemented.

Ninth Modification

The information processing device is not restricted to a mobile phone. The invention may be applied to another kind of information processing device. For example, the information processing device may be a communication device such as a PDA (Personal Digital Assistance), a camera, a portable music player, or a portable videogame device. The information processing device of the present invention may be one that does not have a multi-task function.

Tenth Modification

In the above exemplary embodiment, the invention is implemented as a function of an OS. However, the present invention may be implemented as an application program. Alternatively, the invention may be implemented as a so-called plug-in added to an existing OS or an existing application program. For the configuration, the invention may provide a program causing a computer (information processing device) to execute a process for implementing the above functions. Such a program may be provided by a storage medium such as an optical disk or via a server device on a network such as the Internet.

While various modifications have been shown and described, the present invention is not limited in this regard. As one skilled in the art will recognized that other modifications are possible without departing from the broader aspects of the invention.

What is claimed is:

1. An information processing device comprising:
a display;
a plurality of keys, wherein each of the plurality of keys is physically depressible;
allocating means configured to allocate each of a plurality of functions to each of the plurality of keys, at least one of the plurality of functions allocated to at least one of the plurality of keys dependent on an active application program;
display control means for displaying on the display at least one image indicative of at least one of the plurality of keys, to cause the image to blink, the display control means configured to display the at least one image indicative of the at least one of the plurality of keys to which the at least one of the plurality of functions is allocated, depending on a layout of the plurality of keys such that a relationship between a position(s) of the at least one image within the display and a position of the at least one of the plurality of keys for which the at least one image is indicative is proximate based on a display mode;
lighting means for lighting the plurality of keys to cause the at least one of the plurality of keys only to blink in synchronization with a blinking of the image;
control means for instructing to execute a function upon selection of a key to which the function is allocated; and
changing means for changing the key to which the function is allocated, wherein
the display control means is configured to change a display of the image indicative of the key to which the function is allocated responsive to a change of an allocation performed by the allocating means; and
the display mode is selected from a right-alignment mode and a left-alignment mode.

2. The information processing device according to claim 1, further comprising
notifying means for notifying a user of the key to which the function is allocated by the allocating means, so as to distinguish the key from other keys.

3. The information processing device according to claim 1, wherein
the notifying means is configured to notify each of the plurality of keys in a different way.

4. The information processing device according to claim 1, further comprising
detecting means for detecting a direction of the information processing device, wherein
the changing means is configured to change the key allocation when the detecting means detects a change in the direction.

5. The information processing device according to claim 1, further comprising:
a transformable body; and
detecting means for detecting transformation of the transformable body, wherein
the changing means is configured to change the key to which the function is allocated when the detecting means detects the transformation.

6. The information processing device according to claim 1, further comprising
detecting means for detecting a display direction on the display, wherein
the changing means is configured to change the key to which the function is allocated when the detecting means detects the change in the display direction.

7. The information processing device according to claim 1, wherein
the display control means is configured to display a window on a part of the display and the image beside the window, the window corresponding to the function.

8. A non-transitory tangible computer-readable medium storing program instructions for causing a computer device to execute the program instructions, wherein the program instructions comprise:
first instruction means for allocating each of a plurality of functions to each of a plurality of keys, at least one of the plurality of functions allocated to at least one of the plurality of keys dependent on an active application program, wherein each of the plurality of keys is physically depressible;
second instructions means for displaying on a display at least one image indicative of at least one of the plurality of keys, to cause the image to blink, and displaying the at least one image indicative of the at least one of the plurality of keys to which the at least one of the plurality of functions is allocated, depending on a layout of the plurality of keys such that a relationship between a position(s) of the at least one image within the display and a position of the at least one of the plurality of keys for which the at least one image is indicative is proximate based on a display mode;
third instruction means for lighting the plurality of keys to cause the at least one of the plurality of keys only to blink in synchronization with a blinking of the image;
fourth instruction means for instructing to execute a function upon selection of a key to which the function is allocated;
fifth instruction means for changing the key to which the function is allocated; and
sixth instruction means for changing a display of the image indicative of the key to which the function is allocated when the allocation changes wherein the display mode is selected from a right-alignment mode and a left-alignment mode.

9. An information processing device comprising:
a display;
a plurality of keys, wherein each of the plurality of keys is physically depressible;
allocating means configured to allocate each of a plurality of functions to each of the plurality of keys, at least one of the plurality of functions allocated to at least one of the plurality of keys dependent on an active application program;

display control means for displaying on the display at least one image indicative of at least one of the plurality of keys, to cause the image to blink, the display control means configured to display the at least one image indicative of the at least one of the plurality of keys to which the at least one of the plurality of functions is allocated, depending on a layout of the plurality of keys such that a relationship between a position(s) of the at least one image within the display and a position of the at least one of the plurality of keys for which the at least one image is indicative is proximate based on a display mode;

lighting means for lighting the plurality of keys to cause the at least one of the plurality of keys only to blink in synchronization with a blinking of the image;

control means for instructing to execute a function upon selection of a key to which the function is allocated; and changing means for changing the key to which the function is allocated, wherein the display control means is configured to change a display of the image indicative of the key to which the function is allocated responsive to a change of an allocation performed by the allocating means; and the display mode is selected from a right-hand mode and a left-hand mode.

10. A non-transitory tangible computer-readable medium storing program instructions for causing a computer device to execute the program instructions, wherein the program instructions comprise:

first instruction means for allocating each of a plurality of functions to each of a plurality of keys, at least one of the plurality of functions allocated to at least one of the plurality of keys dependent on an active application program, wherein each of the plurality of keys is physically depressible;

second instructions means for displaying on a display at least one image indicative of at least one of the plurality of keys, to cause the image to blink, and displaying the at least one image indicative of the at least one of the plurality of keys to which the at least one of the plurality of functions is allocated, depending on a layout of the plurality of keys such that a relationship between a position(s) of the at least one image within the display and a position of the at least one of the plurality of keys for which the at least one image is indicative is proximate based on a display mode;

third instruction means for lighting the plurality of keys to cause the at least one of the plurality of keys only to blink in synchronization with a blinking of the image;

fourth instruction means for instructing to execute a function upon selection of a key to which the function is allocated;

fifth instruction means for changing the key to which the function is allocated; and sixth instruction means for changing a display of the image indicative of the key to which the function is allocated when the allocation changes wherein the display mode is selected from a right-hand mode and a left-hand mode.

* * * * *